United States Patent [19]

Krag

[11] 3,887,904

[45] June 3, 1975

[54] WIRE MASS TERMINATION

[75] Inventor: Niels Krag, Pacific Palisades, Calif.

[73] Assignee: Electronic Memories & Magnetics Corp., Hawthorne, Calif.

[22] Filed: Aug. 22, 1973

[21] Appl. No.: 390,357

[52] U.S. Cl......... 340/174 MA; 340/174 M; 29/604; 29/625

[51] Int. Cl............................ G11c 5/08; H01f 41/10

[58] Field of Search .. 340/174 M, 174 MA; 29/604, 29/625; 339/95 D, 275; 174/68.5

[56] References Cited

UNITED STATES PATENTS

| | | | |
|---|---|---|---|
| 3,013,188 | 12/1961 | Kohler | 29/625 |
| 3,092,759 | 6/1963 | Sommer | 339/275 R |
| 3,114,194 | 12/1963 | Lohs | 29/625 |

*Primary Examiner*—James W. Moffitt
*Attorney, Agent, or Firm*—Lindenberg, Freilich, Wasserman, Rosen & Fernandez

[57] ABSTRACT

Electrical wires extending through magnetic cores on a circuit board are fixed near their ends to the board by projecting portions of the wires through holes in the board to form wire loops in the holes, and retaining the loops in place temporarily prior to soldering them in place. Temporary retention of the wire loops can be accomplished with retainers mounted on the lower side of the board, each retainer being a sheet-like portion of conductive material with a large diameter central hole and a pair of narrow slits extending in opposite directions from the central hole. A plunger forces the wires down through the holes in the board and the central hole in the retainer, while the wires are maintained in tension, so that the wires enter the slits in the retainer and are captured therein. In another method, the wire loops are held by adhesive or are bent over to temporarily hold them in place.

11 Claims, 16 Drawing Figures

WIRE MASS TERMINATION

BACKGROUND OF THE INVENTION

This invention relates to the mounting of electrical wires in circuit assemblies.

Magnetic core memories are constructed by mounting an array of tiny magnetic cores on a substrate, and projecting a multiplicity of electrical wires through the central holes of the cores. The ends of the wires are normally fastened to terminals on the board to facilitate later electrical connections. Fastening of the wire ends is often performed by a worker who picks up an individual wire with tweezers and places the wire between a soldering iron and the terminal. The worker rolls or scrubs the wire with the soldering tip to remove the insulation and to heat the wire and terminal. The worker then applies a small amount of flux and solder (unless the terminal is pre-coated with solder) to the wire and terminal to solder the wire in place. In can require a few minutes to make each solder joint, when the time to pick out the individual wires and perform the other operations is included. A memory may include thousands of wires, so that a large amount of time is required to perform the termination operations, and the labor involved can constitute a significant portion of the cost of the magnetic core memory.

SUMMARY OF THE INVENTION

In accordance with one embodiment of the present invention, a magnetic core memory assembly and wire termination method are provided which minimize the labor required to fix the ends of the wires that project through the magnetic cores. The assembly includes a substrate which holds an array of magnetic cores and which has a row of holes spaced from the cores. A row of retainers is fixed to a lower face of the board, each retainer having a central hole aligned with a hole in the board and a pair of narrow slits extending from opposite sides of the hole. A wire which projects through the cores is mounted to the board by forcing the wire into a loop shape that is projected through the hole in the board and through the central hole of the retainer so that the wire enters the slits in the retainer. The slits are slightly narrower than the diameter of the wires so that they retain the wire in place. After all of the wires have been thus mounted on the board, the lower surface of the board is wave soldered to more permanently fix the wires in place. The loop formed by projecting the wire through the hole can instead be temporarily held in place by adhesive or by bending the loop so it cannot be pulled out.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
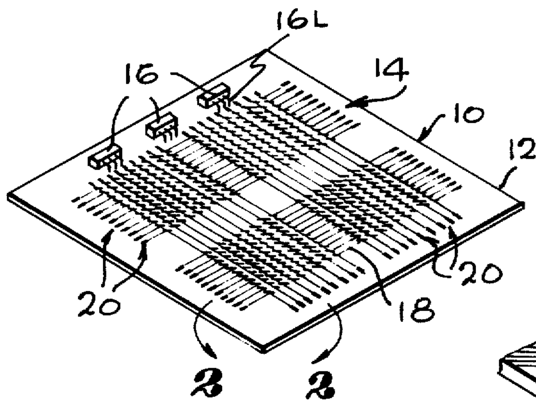
FIG. 1 is a perspective view of a circuit assembly constructed in accordance with one embodiment of the present invention.
Figure 2:
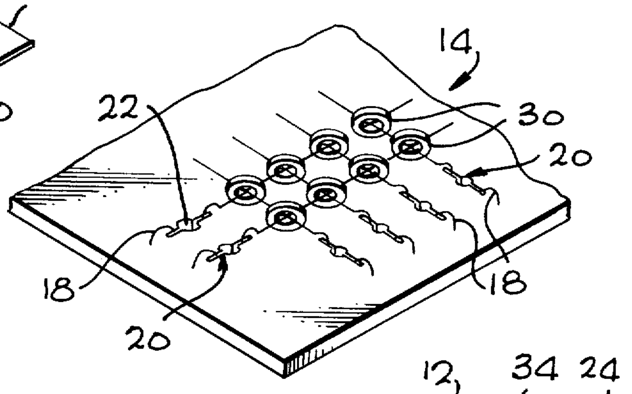
FIG. 2 is a partial perspective view of the area 2—2 of FIG. 1.

FIG. 1 illustrates a circuit assembly 10 of the invention, which includes a substrate or board 12 and an array 14 of toroidal magnetic cores arranged in rows and columns, the particular array being divided into four squares or "quads." Several integrated circuits 16 are also mounted on the board. The array of cores also includes numerous wires 18 which are strung through holes in the cores. The ends of the wires are terminated at termination regions 20 disposed outside of the array of cores. A typical array 14 that is disposed on a board may include many thousands of cores and many hundreds of wires 18, so that many hundreds of wire terminations must be made to hold the wire ends in place.

Figures 3, 5:
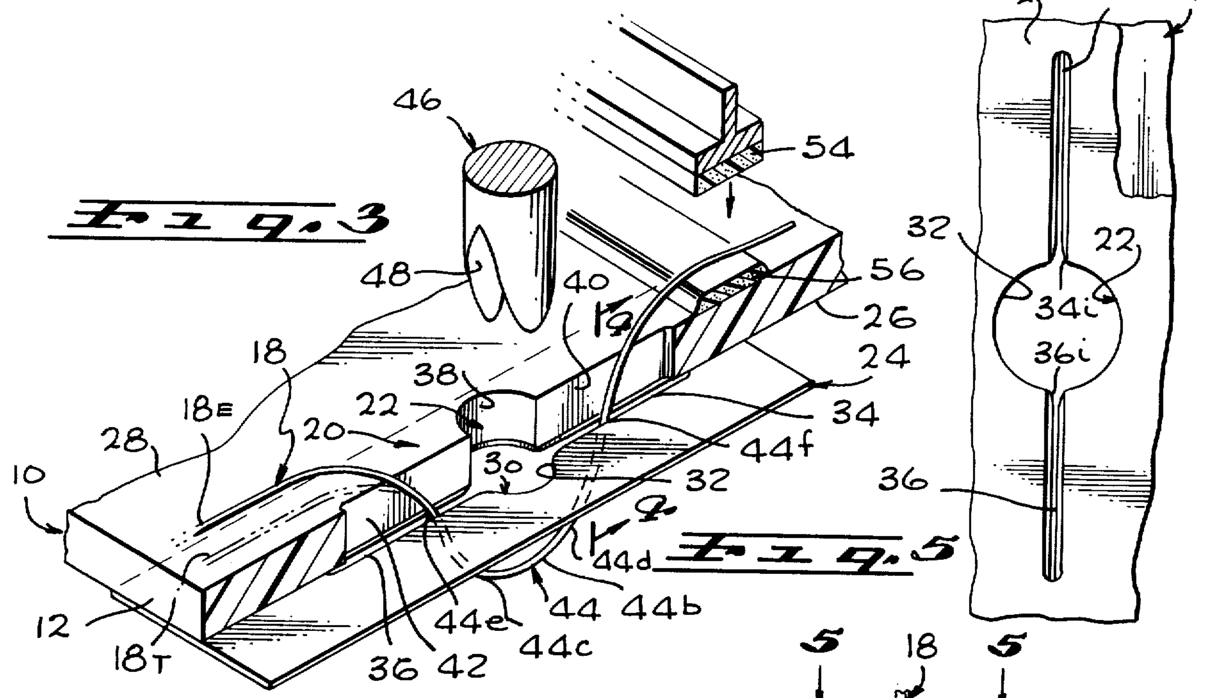
FIG. 3 is an enlarged perspective view of a portion of the assembly of FIG. 2, showing the manner in which the wire is projected through the board.
FIG. 5 is a view taken on the line 5—5 of FIG. 4, but shown prior to the projection of the wire through the board.
Figure 5A:
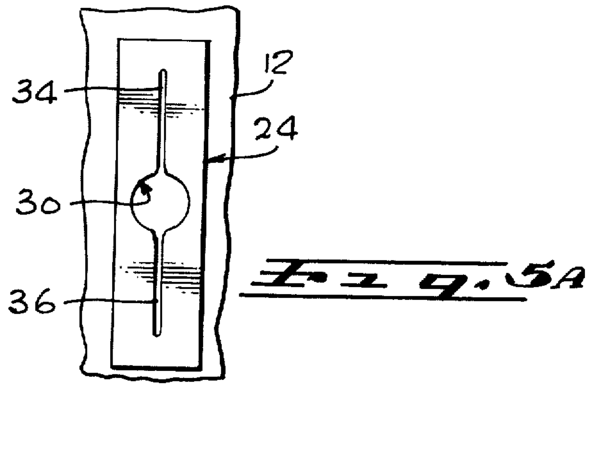
FIG. 5A is a view taken on the line 5A—5A of FIG. 4, prior to the projection of the wire through the board.
Figure 4:
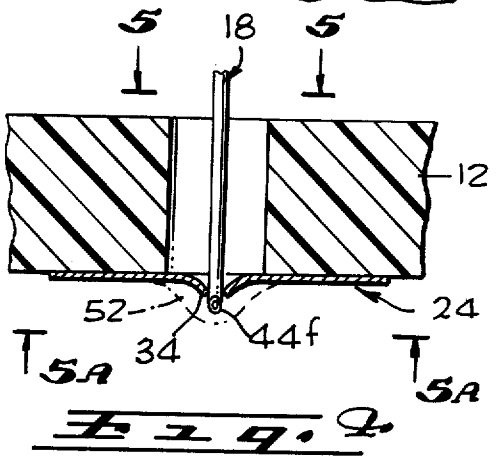
FIG. 4 is a view taken on the line 4—4 of FIG. 3.

As also illustrated in FIGS. 2–6 and particularly FIG. 3, the termination regions 20 include holes 22 formed in the board 12, and retainers 24 mounted on the lower face 26 of the board opposite the upper face 28 on which the cores 30 are mounted. Each retainer includes a sheet-like portion of electrically conductive material with a hole 30 aligned with a hole 22 of the board. The retainer hole 30 includes a large diameter central portion 32 and a pair of narrow slits 34, 36 extending from diametrically opposite sides of the central portion. The board hole 22 is similarly constructed, with a central portion 38 of about the same diameter as the central portion 32 of the retainer hole, and with a pair of slots 40, 42 lying over much of the retainer slits 34, 36, but with the board slots 40, 42 being much wider than the retainer slits. The wire 18 is held in place by projecting it so that it extends in a return loop 44 through the holes in the board and retainer and is caught in the slits 34, 36 of the retainer.

The wire 18 is deformed to the position shown in FIG. 3 by a plunger 46 that is of small enough diameter to project through the central hole portions 38, 32 of the board and retainer holes. This operation is performed after the wire 18 has been projected through the holes of the magnetic cores and lies over the hole 22 in the board. The plunger 46 has a central recess 48 at its lower end which can receive the wire 18 and center it on the hole 22. The plunger is moved down to receive the wire 18 and the plunger continues to move down through the hole in the board 22 and the hole 30 in the retainer, until a portion of the wire at 44b lies below the retainer. The plunger therefore forms the loop 44 in the wire. During the projection of the wire through the holes, the wire is maintained in tension so that the legs 4c and 44d of the loop tend to move apart and through the slits 34, 36 in the retainer. The inner ends 34*i*, 36*i* (FIG. 5) of the slits gradually widen to form a smooth transition, to receive the wire from the central hole portion 32, and these inner ends lie within the boundries of the board holes. The slits 34, 36 are slightly smaller in width than the diameter of the wire 18, so that they tend to retain the wire portions or legs 44*c*, 44*d* in position. Thus, after the plunger 46 is withdrawn, the loop 44 of wire is held at two locations 44*e*, 44*f* where it projects through the slits.

Figure 6:
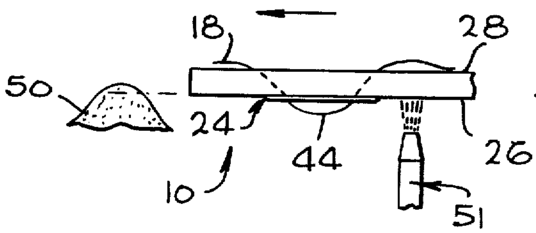
FIG. 6 is a partial side elevation view of the assembly of FIG. 1, showing the manner in which the wires are soldered in place.

After all of the wire ends have been projected through their corresponding retainers, all of the wires can be soldered in place. This can be accomplished by mass soldering techniques such as wave soldering wherein solder is applied to substantially the entire lower surface of the board. The insulation on the wires can be removed prior to the soldering, as illustrated in FIG. 6, by blowing hot air or hot inert gas through a nozzle 51 to remove insulation of the wire loop 44. The assembly 10 then moves across a wave of solder 50 so that solder is applied to the lower face of the board. This results in a quantity of solder being left around the wire portions of 44e and 44f where the wire passes through the slits 34, 36 in the retainer. Such a quantity of solder is indicated at 52 in FIG. 4. As illustrated in FIG. 1, various components 16 are also mounted on the board 12, with leads 16L of the components projecting through holes in the board. When the solder wave is applied to the lower surface of the board, these component leads 16L are also soldered in place. Thus, the various components can be fixed to the board at the same time as the wire ends are all fixed in place, with a minimum of labor.

FIG. 3 illustrates the manner in which the wire 18 is projected through the holes in the board and retainer. The wires 18 may be strung through the magnetic cores 30 by a variety of methods, such as the stringing process described in U.S. Pat. application Ser. No. 245,542, filed Apr. 19, 1972 now U.S. Pat. No. 3,792,527, wherein the front ends of the wires are attached to needles that are simultaneously projected through the different cores of the array and wherein the needles are then pulled to pull all of the wires through the cores. After the wires have been pulled through the cores, and while they are still under tension, a brake 54 (FIG. 3) is pressed down against a raising strip 56 that has been either temporarily or permanently located on the board 12 in front of the holes 22. With the wire 18 still in tension, the plunger 46 is depressed to project the wire through the holes in the board and retainer. The plunger is then lifted and the wire 18 is cut at a location near the board hole 22 as at 18E. The brake 54 can be lifted and the raising strip 56 removed. The reason why the raising strip 56 is utilized is to provide a strain relief loop in the wire so that it is not constantly under tension along the portion projecting through the cores. If the projection of the wires through the retainers is accomplished immediately after stringing of the wires through the cores, much effort is saved because the wires are already maintained at accurately controlled spacings. Thus, with the wires under tension at that time, they will tend to lie directly over corresponding holes 22 of the board, so that the wires do not have to be individually picked up and held over the holes in order to assure that they will be engaged by the plunger 46.

The wire 18 has a thin layer of insulation around an electrically conductive core. A typical wire may have a copper conductor of three-thousandths inch diameter surrounded by a three-ten thousandths polyurethane insulation which is surrounded by an even thinner layer or jacket of nylon. The insulation may be automatically removed during the wave soldering step by the hot solder that flows past the wire. However, if this heat is not sufficient, hot air or inert gas may be utilized to remove the insulation prior to soldering, by blowing the hot gas at the wire portion that projects through the retainer. In some applications, individual welding or other attaching steps may be utilized to permanently fix the wires in position. However, even in such cases, the method of the invention is useful to securely locate the wires so as to facilitate the welding or other attaching steps. Where the wire is soldered or otherwise joined to the retainer 24, the retainer itself may be utilized as a terminal to which other circuits are connected.

Figure 7:
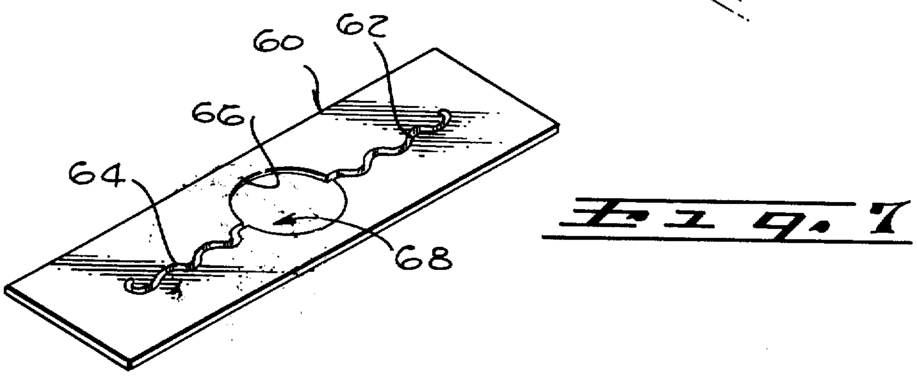
FIG. 7 is a partial perspective view of a retainer constructed in accordance with another embodiment of the invention, in which the retainer slits are of sinuous form.

FIG. 7 illustrates a retainer 60 constructed in accordance with another embodiment of the invention, wherein the slits 62, 64 that radiate from a central portion 66 of the hole 68 are not straight, but are instead corrugated or sinuous so that they follow a wavy path. This retainer 60 is useful in cases where very thin magnet wire is utilized, such as wire less than about two-thousandths inch diameter. In many cases, it is difficult to etch or otherwise form slits less than a couple of thousandths inch in width so as to reliably engage wire only slightly wider than the slits. The corrugated or sinuous slits 62, 64 can retain the wire even if the wire is of greater diameter than the slits, since the wire will not readily move along the wavy slits.

Figure 8:
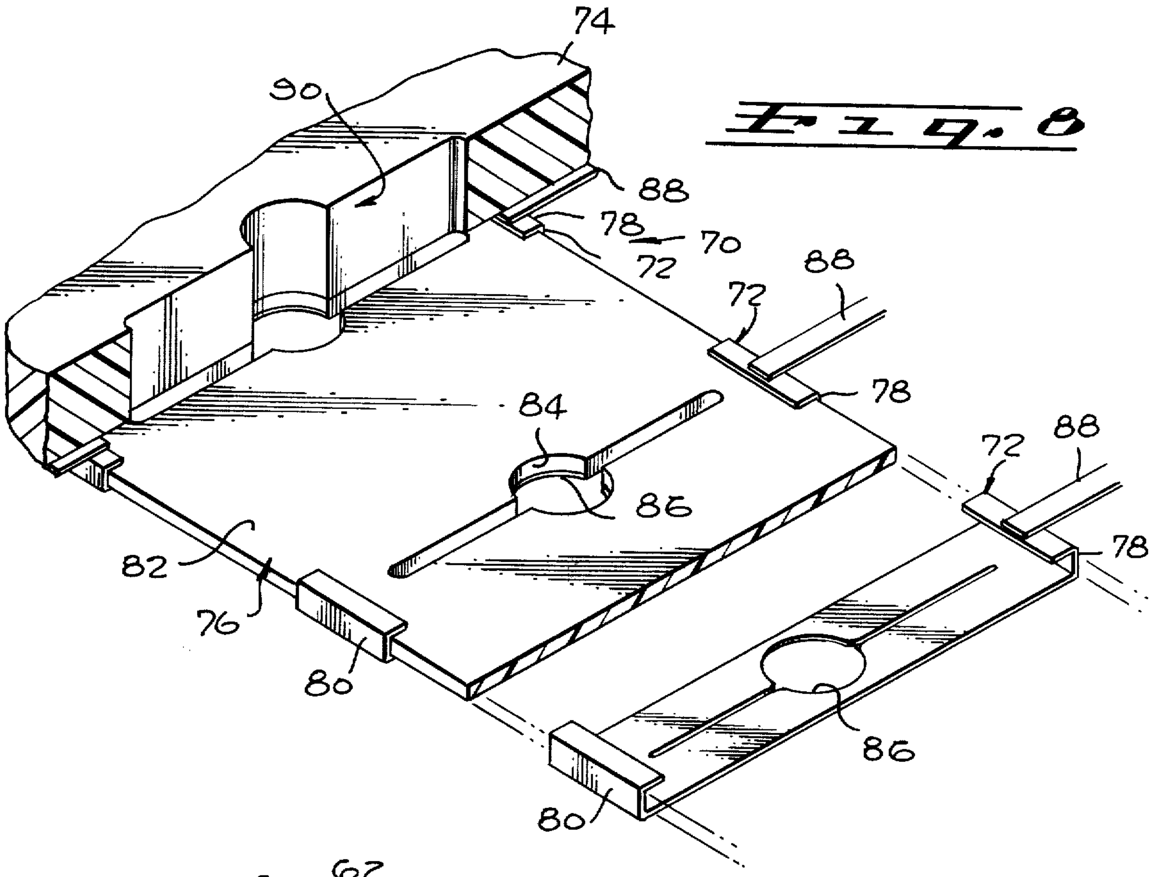
FIG. 8 is a partial perspective view of a circuit board assembly constructed in accordance with still another embodiment of the invention, in which the retainers are originally formed in an assembly mountable as a unit on a board.

FIG. 8 illustrates termination assemblies 70 in which the retainers 72 are applied to the board 74 on which the magnetic cores are mounted, by means of a carrier 76. The carrier 76 is a strip or sheet-like member of insulative material on which the retainers 72 are mounted. Each retainer has overhanging end portions 78, 80 that extend around a corresponding edge of the carrier and which lie on a face 82 of the carrier which is closest to the insulative board 74. The carrier itself has holes 84 aligned with the holes 86 in the retainers. The carrier 76 with the retainers 72 thereon is constructed as a single unit which is mounted by adhesive or the like on the lower face of the board 74. This facilitates handling of the retainers. The board 74 is formed with a printed circuit on its lower face which includes thin printed circuit conductors 88 that extend to positions adjacent to the holes 90 in the board 74. The carrier and retainer assembly is mounted so that an end portion 78 of each retainer presses against one of the conductive strips 88. When a wave of solder is applied to the lower surface of the assembly, a quantity of solder will securely connect each conductive strip 88 of the printed circuit with an end portion 78 of a retainer.

Figure 9:
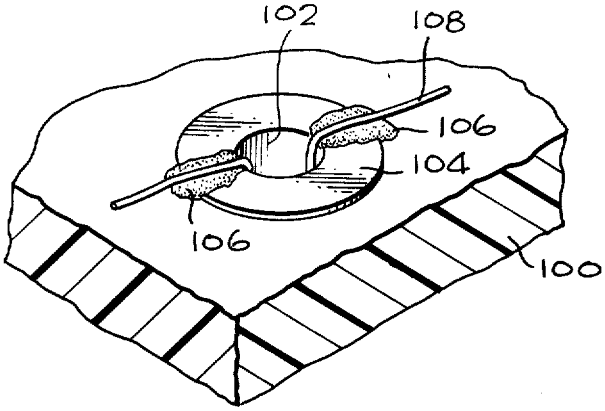
FIG. 9 is a partial perspective view of a circuit board assembly constructed in accordance with yet another embodiment of the invention, wherein the wire loop is held by an adhesive.
Figure 10:
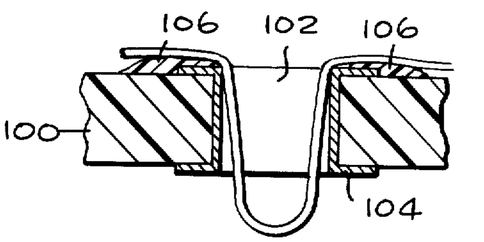
FIG. 10 is a sectional view of the assembly of FIG. 9.

FIGS. 9–10 illustrate another method for terminating wires on a circuit board. The board 100 is formed with holes 102 which are plated by a layer 104 of electrically conductive and solder receptive material such as copper. The layer 104 plates the hole and a small pad region surrounding the hole on each face of the insulative board. Regions 106 of adhesive are applied around the hole 102. The wire 108 is deformed into a loop shape in the same manner as that shown in FIG. 3, by forcing a projecting member against the wire and through the hole. However, the adhesive 106 is utilized to keep the looped wire in place after the projection member has withdrawn from the hole. The adhesive 106 therefore eliminates the need for a slitted plate to retain the wire. After the wire has been deformed, the insulation may be removed and the wire soldered in place as by the wave soldering technique illustrated in FIG. 6. The adhesive 106 is of an easily removed type such as a water soluable adhesive, and it may be removed by merely dipping the circuit board assembly in water.

Figure 12:
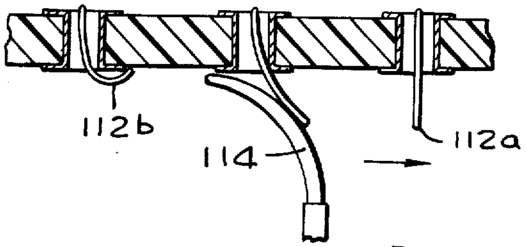
FIG. 12 is a sectional view of the assembly of FIG. 11, showing the method of bending the wire loop.
Figure 11:
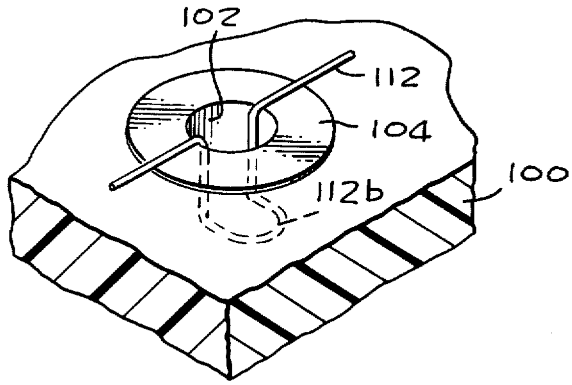
FIG. 11 is a partial perspective view of a circuit board assembly constructed in accordance with a still further embodiment of the invention, wherein the projected wire loop is held by bending its lower end.

FIGS. 11 and 12 illustrate another termination method which eliminates the need for the slitted plate. The circuit board 100 is similar to the board of FIGS. 9–10 in that it has holes 102 plated by a conductive layer 104. The wire 112 is first deformed into a simple loop by a projection member in a manner similar to the method shown in FIG. 3. However, the loop is then bent to one side, as illustrated in FIG. 12, by a flexible wiper blade 114. The loops 112*a* are deformed to the condition 112*b* as the flexible wiper blade passes over them. The wire 112 is a typical magnet wire which is easily deformable, so that it retains its bent-loop shape, which prevents accidental withdrawal of the loop prior to soldering of the wire into place.

Figure 13:
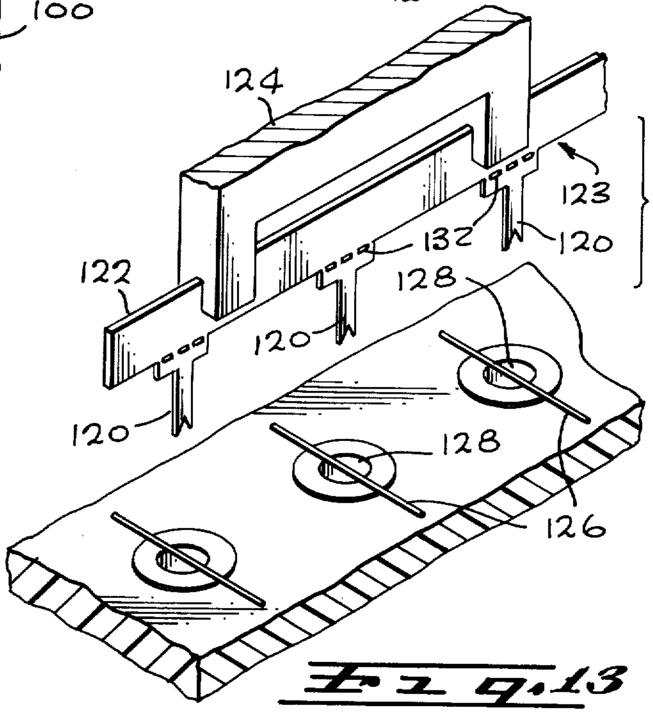
FIG. 13 is a partial perspective view of a circuit board assembly and wire projecting apparatus constructed in accordance with still another embodiment of the invention, wherein projecting members are used which remain in the circuit assembly.
Figure 14:
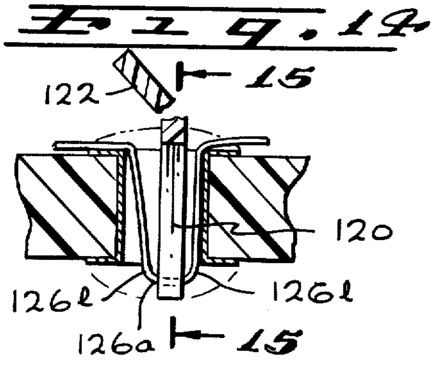
FIG. 14 is a sectional view of the assembly of FIG. 13, showing how the projecting members are separated from a holder.
Figure 15:
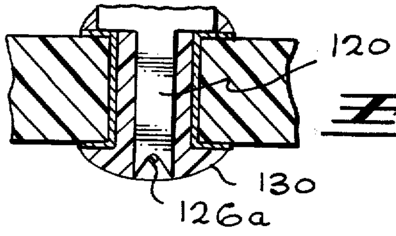
FIG. 15 is a view taken on the line 15—15 of FIG. 14.

FIGS. 13–15 illustrate still another termination, which utilizes expendable projecting members 120. The projecting members 120 are formed on an integral holder 122 which can be clamped to a ram 124. After the wires 126 are held in extension over plated through holes 128, the ram 124 is moved down to move all the projecting members 120 into the hole 128. The projecting members 120 then lie in the holes between the legs 126L of the loop 126a. Instead of withdrawing the projecting members 120, they are then separated from the holder 122, so that the projecting members 120 remain behind in the holes. Solder 130 is then applied to the holes to solder the wire 126 and the projecting members 120 into place. In order to facilitate the separation of the projecting members from the holder 122, the projection assembly 123 is provided with perforations at 132 to facilitate break-off. The assembly 123 can be formed at low cost by punching it out of sheet metal. The holder 122 not only holds all of the projection members 120 over their corresponding holes, but also holds them in the proper orientation so that the recessed ends of the projecting members 120 are aligned with the axes of the wires 126.

Thus, the invention provides a mass termination design and method for fixing wires in place to a circuit board assembly. This is accomplished by forming holes in an insulative board, deforming the wires into the holes as loops, and then soldering the loops in place. The loops can be temporarily held in place by retainers on the underside of the board, with holes in the retainers aligned with the holes in the board and with slits in the retainer for receiving a wire and holding it in place. The wire loops can also be held by adhesive or by bending over a lower portion of each wire loop. If desired, the wire can be soldered to the retainer by a mass soldering technique wherein solder is applied to a large area on the underside of the board.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A circuit assembly comprising:
an insulating board having a plurality of holes;
a pad of conductive material surrounding each of said holes in the board, each pad having a slit with a portion lying within the boundary of a corresponding hole;
a plurality of electrical devices mounted on said board;
a plurality of wires coupled to said electrical devices and extending over a face of the board and through said holes and slits.

2. The assembly described in claim 1 including:
solder disposed in the holes and on the conductive pads, the solder being disposed also about the wire portions extending through the slits to hold the wires in place.--

3. A circuit comprising:
an insulating board having a plurality of holes;
a plurality of electrical devices mounted on said board;
a plurality of wires coupled to said devices and extending over a first face of the board;
a plurality of electrically conductive retainers, each including a thin sheet of electrically conductive material with a hole therein aligned with the hole in said insulating board, said hole in said retainer including a first portion of a width larger than the diameter of said wires and a narrow slit extending from at least one side of the first hole portion at a region which lies within the boundaries of one of said holes in the board;
each of said wires passing through one of said holes in the board and through a slit in a retainer.

4. The circuit assembly described in claim 3 wherein:
said slits in the retainers are of smaller width than the diameter of said wires.

5. The circuit assembly described in claim 3 wherein:
said slits have a sinuous form.

6. The circuit assembly described in claim 3 including:
a quantity of solder joining each of said wires to its respective retainer at the location where the wire passes through the slit in the retainer.

7. The circuit assembly described in claim 3 wherein:
each retainer hole has a pair of slits, said pair of slits extending from opposite sides of the first hole portion of the retainer, and the wire passing down through one of said slits, around a return loop, up through the other slit and up through the hole in the board, said slits being narrower than the wire passing therethrough to retain the wire in place, and including a quantity of solder joining said wire to the retainer at the locations where the wire passes through the slits.

8. A magnetic core assembly comprising:

an insulative substrate having a plurality of holes;

a plurality of magnetic cores mounted on a first face of said substrate;

a plurality of wires extending through different sets of said cores and through said holes in said substrate; and a plurality of electrically conductive retainers mounted on said substrate, each having a hole with a first portion larger than the cross section of said wire and aligned with a hole in the substrate, and each retainer hole having a narrow slit extending therefrom;

each of said wires extending through a hole in the substrate and through one of the slits.

9. The circuit assembly described in claim 8 wherein:

each hole in a retainer has a pair of slits, said pair of slits extending from opposite sides of the first hole portion of the retainer, and the wire passing down through one of said slits, around a return loop, up through the other slit and up through the hole in the board, said slits being narrower than the wire passing therethrough to retain the wire in place, and including a quantity of solder joining said wire to the retainer at each location where the wire passes through a slit.

10. The circuit assembly described in claim 8 including:

a printed circuit on the second face of the substrate, said printed circuit including a plurality of thin conductors extending to positions near the holes in the substrate; and a sheet-like retainer carrier with a first face disposed against a second face of the substrate, said retainers mounted on a second face of the carrier opposite the first face thereof, and each retainer having an end portion extending beyond an edge of the carrier and bent around the edge so its extreme end lies against the first carrier face and against one of said thin conductors of the printed circuit.

11. A magnetic core assembly comprising:

an insulative substrate having a plurality of holes;

a plurality of magnetic cores mounted on a first face of said substrate;

a plurality of electrically conductive retainers mounted on a second face of said substrate opposite said first face, each retainer having a hole with a first portion at least twice as large as the diameter of said wires and positioned in line with a hole in the substrate so that a plunger can project simultaneously through the holes in the substrate and retainer, each retainer hole also having a pair of slits narrower than the diameter of said wires and extending from opposite sides of said first hole portion;

a plurality of wires, each projecting through a plurality of said magnetic cores and in a return loop through a hole in the substrate and through a hole in a retainer, each leg of the loop projecting through a different slit of the retainer hole; and solder regions, each attaching a leg of a wire loop to the retainer through which the wire projects.

* * * * *